US012087195B2

(12) United States Patent
Kwon et al.

(10) Patent No.: US 12,087,195 B2
(45) Date of Patent: Sep. 10, 2024

(54) SOURCE AMPLIFIER HAVING FIRST AND SECOND MIRROR CIRCUITS AND DISPLAY DEVICE INCLUDING THE SAME

(71) Applicant: SAMSUNG ELECTRONICS CO., LTD., Suwon-si (KR)

(72) Inventors: Taek Su Kwon, Suwon-si (KR); Woojoo Kim, Seoul (KR); Dongwook Suh, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/679,436

(22) Filed: Feb. 24, 2022

(65) Prior Publication Data

US 2022/0415230 A1 Dec. 29, 2022

(30) Foreign Application Priority Data

Jun. 28, 2021 (KR) ........................ 10-2021-0084204

(51) Int. Cl.
*G09G 3/3275* (2016.01)
*G09G 3/20* (2006.01)

(52) U.S. Cl.
CPC ......... *G09G 3/20* (2013.01); *G09G 2310/027* (2013.01); *G09G 2310/0291* (2013.01); *G09G 2320/0252* (2013.01)

(58) Field of Classification Search
None
See application file for complete search history.

(56) References Cited

U.S. PATENT DOCUMENTS

| | | | | |
|---|---|---|---|---|
| 7,760,199 | B2 | 7/2010 | An | |
| 8,686,987 | B2 | 4/2014 | Tsuchi | |
| 10,467,973 | B2 | 11/2019 | Ko et al. | |
| 10,467,975 | B2 | 11/2019 | Suh et al. | |
| 10,886,920 | B2 | 1/2021 | Kim et al. | |
| 10,891,914 | B2 | 1/2021 | Seong et al. | |
| 2019/0295488 | A1* | 9/2019 | Guo | G09G 3/3677 |
| 2022/0122542 | A1* | 4/2022 | Kim | G09G 3/2074 |
| 2022/0238081 | A1* | 7/2022 | Jung | G09G 3/3688 |

* cited by examiner

*Primary Examiner* — Amr A Awad
*Assistant Examiner* — Donna V Bocar
(74) *Attorney, Agent, or Firm* — Fish & Richardson P.C.

(57) ABSTRACT

Disclosed is a source amplifier which includes a first circuit that outputs a first current to an output terminal of the source amplifier by amplifying an input voltage, and a second circuit that is connected with the first circuit and outputs a second current to the output terminal based on the input voltage. The second circuit includes a third circuit that adjusts a level of the second current in response to an enable signal.

9 Claims, 8 Drawing Sheets

SOURCE AMPLIFIER HAVING FIRST AND SECOND MIRROR CIRCUITS AND DISPLAY DEVICE INCLUDING THE SAME

CROSS-REFERENCE TO RELATED APPLICATION

This application claims priority under 35 U.S.C. § 119 to Korean Patent Application No. 10-2021-0084204 filed on Jun. 28, 2021, in the Korean Intellectual Property Office, the disclosures of which are incorporated by reference herein in their entireties.

BACKGROUND

1. Field

Embodiments relate to a source amplifier and a display device including the same.

2. Description of the Related Art

An electronic device may include a display driver integrated circuit (DDI) for displaying image data on a display panel. The display driver integrated circuit may include a source driver that provides input data signals associated with image data to a plurality of pixels included in the display panel through source lines. The source driver may include source channels respectively connected with the source lines. One source channel may include a source decoder that selects one of a plurality of gamma voltages generated by a gamma voltage generator based on an input data signal, and may include a source amplifier that amplifies or buffers the selected voltage so as to be provided to a relevant pixel as a data voltage within a given time.

As a distance between the source driver and the pixels increases, resistances and capacitances of the source lines may increase. As such, a time to charge pixels located distant from the source driver with a data voltage may increase.

SUMMARY

According to an embodiment, a source amplifier which outputs a data voltage to a display panel based on a first driving voltage, a second driving voltage, a first input voltage, and a second input voltage may include a first circuit that generates a first to a fourth current based on the first driving voltage, the second driving voltage, the first input voltage, and the second input voltage and outputs the data voltage to an output terminal of the source amplifier based on the first to fourth currents, and a second circuit that is connected with the first circuit and supplies a fifth current to the output terminal based on the first driving voltage, the second driving voltage, and the second input voltage. The second circuit may include a first mirror circuit that is connected with a first terminal to which the first driving voltage is applied and supplies a sixth current to the output terminal, and a second mirror circuit that is connected with a second terminal to which the second driving voltage is applied and supplies a seventh current from the output terminal to the second terminal.

According to an embodiment, a display device may include a display panel that includes a plurality of pixels, and a display driver integrated circuit. The display driver integrated circuit may include a gate driver that is connected with the plurality of pixels through a first to an m-th gate line and enables the first to m-th gate lines, a source driver that is connected with the plurality of pixels through a first to an n-th source line and includes a plurality of source amplifiers respectively connected with the first to n-th source lines, and a logic block that generates signals for controlling the gate driver and the source driver. A first source amplifier of the plurality of source amplifiers may include a first circuit that outputs a first current to an output terminal of the first source amplifier by amplifying an input voltage, and a second circuit that is connected with the first circuit and outputs a second current to the output terminal based on the input voltage. The second circuit may include a third circuit that adjusts a level of the second current in response to an enable signal.

According to an embodiment, a display device may include a display panel that includes a plurality of pixels, and a display driver integrated circuit. The display driver integrated circuit may include a gate driver that is connected with the plurality of pixels through a first to an m-th gate line and enables the first to m-th gate lines, and a source driver that is connected with the plurality of pixels through a first to an n-th source line and includes a plurality of source amplifiers respectively connected with the first to n-th source lines. A first source amplifier of the plurality of source amplifiers may include a first circuit that generates a first to a fourth current based on a first driving voltage, a second driving voltage, a first input voltage, and a second input voltage and outputs a first data voltage to an output terminal of the first source amplifier based on the first to fourth currents, and a second circuit that is connected with the first circuit and supplies a fifth current to the output terminal based on the first driving voltage, the second driving voltage, and the second input voltage. The second circuit may include a first mirror circuit that supplies a sixth current to the output terminal based on the first driving voltage, and a second mirror circuit that supplies a seventh current from the output terminal to a first terminal to which the second driving voltage is applied.

BRIEF DESCRIPTION OF THE FIGURES

Features will become apparent to those of skill in the art by describing in detail example embodiments with reference to the attached drawings in which.

DETAILED DESCRIPTION

Figure 1:
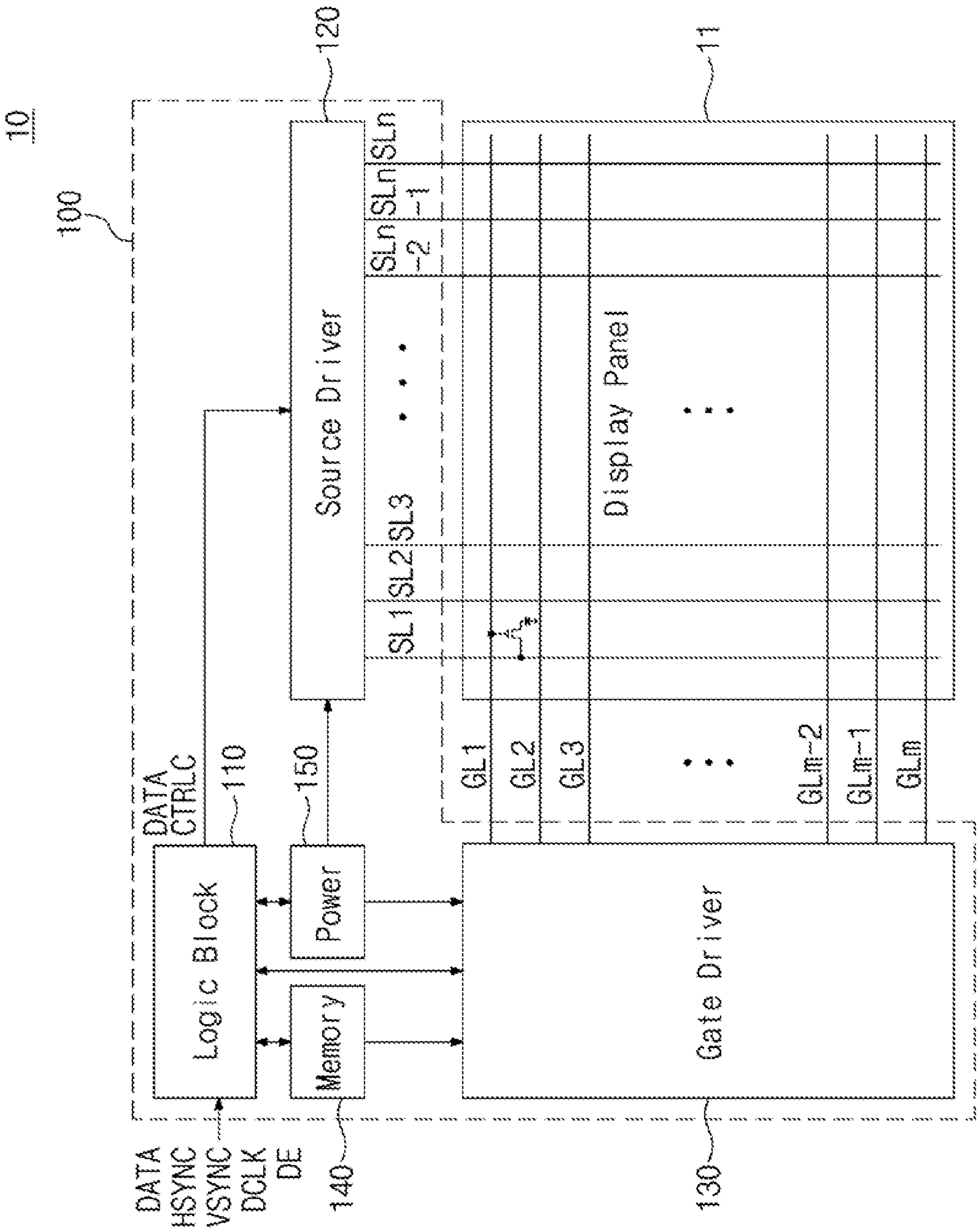
FIG. 1 illustrates a block diagram of a display device, according to an example embodiment.

FIG. 1 illustrates a block diagram of a display device 10, according to an example embodiment.

Referring to FIG. 1, the display device 10 may include a display driver integrated circuit (DDI) 100 and a display panel 11.

The display driver integrated circuit 100 may include a logic block 110, a source driver 120, a gate driver 130, a memory 140, and a power source 150.

The display device 10 may be included in a portable communication terminal such as a smartphone; a small-sized electronic device such as a personal digital assistant (PDA), a portable media player (PMP), a wearable device, a camera, a portable game console, an e-book reader, or a tablet PC; a large-sized electronic product such as a television or a monitor.

The display panel 11 may include a plurality of pixels. The display device 10 may receive image data from another component (e.g., an application processor (AP)) of an electronic device in which the display device 10 is included. The display device 10 may display the received image data or an image corresponding to the received image data through the plurality of pixels of the display panel 11.

Each of the plurality of pixels may be connected with a corresponding one of gate lines GL1 to Gm and a corresponding one of source lines SL1 to Sn. In response to voltages (or signals) of the corresponding gate line and the corresponding source line, each of the plurality of pixels may display image information corresponding to the voltages (or signals). Each of the plurality of pixels may display one of a plurality of colors. For example, one pixel may display one of a red, a green, or a blue.

The display panel 11 may be implemented with an organic light-emitting diode (OLED) display panel. In this case, each of the plurality of pixels may include a transistor and a diode as illustrated in FIG. 1. A gate terminal of the transistor may be connected with one of the gate lines GL1 to Gm. A first terminal (e.g., a source) of the transistor may be connected with one of the source lines SL1 to Sn. A second terminal (e.g., a drain) of the transistor may be connected with the diode.

In other implementations, the display panel 11 may be implemented as various kinds of display panels including a liquid crystal display (LED) panel. In this case, the plurality of pixels may further include any other elements (or components) not illustrated in FIG. 1. For example, in the case where the display panel 11 is implemented with an LED panel, unlike the example illustrated in FIG. 1, each of the plurality of pixels may include a liquid crystal instead of a diode. In this case, the display device 10 may further include other component(s) such as a backlight (not illustrated).

In the display driver integrated circuit 100, the logic block 110 may receive the following timing signals from the outside of the display device 10: image data “DATA” to be displayed on the display panel 11, a horizontal synchronization signal HSYNC, a vertical synchronization signal VSYNC, a dot clock signal DCLK, and a data enable signal DE.

The logic block 110 may generate various control signals for controlling the source driver 120, the gate driver 130, the memory 140, and the power source 150, based on the timing signals. For example, the logic block 110 may generate control signals for controlling the source driver 120 and the gate driver 130 such that each of the plurality of pixels included in the display panel 11 displays the corresponding image information. For example, the logic block 110 may generate control signals CTRLS for controlling the source driver 120, based on the timing signals received from an external device.

The logic block 110 may be referred to as a “timing controller” or may include a timing controller.

Under control of the logic block 110, the source driver 120 may provide image information to be displayed to the plurality of pixels through the source lines SL1 to Sn. For example, in response to the control signals CTRLS generated by the logic block 110, the source driver 120 may convert the image data “DATA” into data voltages for displaying the image data “DATA” on the display panel 11. The source driver 120 may provide the data voltages to the plurality of pixels through the source lines SL1 to SLn.

The gate driver 130 may control the gate lines GL1 to Gm under control of the logic block 110. For example, the gate driver 130 may sequentially provide gate signals to the gate lines GL1 to Gm. A gate signal may refer to a signal for activating a plurality of pixel connected with a gate line corresponding to the gate signal.

The memory 140 may be also referred to as a “graphic memory” or a “graphic random access memory (GRAM)”. The memory 140 may receive and store data to be output through the source driver 120 from the logic block 110. For example, the logic block 110 may provide the image data “DATA” received from the outside of the display device 10 to the memory 140.

In another implementation (not shown), the memory 140 may directly send the stored data to the source driver 120 under control of the logic block 110.

When a still image is displayed through the display device 10, the memory 140 may output the stored image data, which may prevent the display device 10 from continuously receiving other image data from the external device. The memory 140 may reduce power consumption of the display device 10 and may reduce heat generation of the display device 10.

In other implementations (not shown), the display driver integrated circuit 100 may not include the memory 140, or the display driver integrated circuit 100 may include two or more memories.

The power source 150 may supply a power to the logic block 110, the source driver 120, the gate driver 130, and the memory 140. The power source 150 may supply a power used to drive the respective components of the display device 10.

The display device 10 may display an image by the frame. A time that is used to display one frame may be defined as a vertical period. The vertical period may be determined by a scan rate of the display device 10. For example, when the scan rate of the display device 10 is 60 Hz, the vertical period may be 1/60 second, that is, about 16.7 ms.

The gate driver 130 may scan all the gate lines GL1 to Gm during one vertical period. For example, under control of the logic block 110, the gate driver 130 may apply a gate signal sequentially to the gate lines GL1 to Gm. A time that is used for the gate driver 130 to scan each of all the gate lines GL1 to Gm may be defined as a horizontal period.

During one horizontal period, the source driver 120 may apply gray scale voltages to pixels of the display panel 11. A gray scale voltage may refer to a data voltage that is output from the source driver 120 based on the image data “DATA”. Brightness of each pixel of the display panel 11 may be determined by a gray scale voltage.

Figure 2:
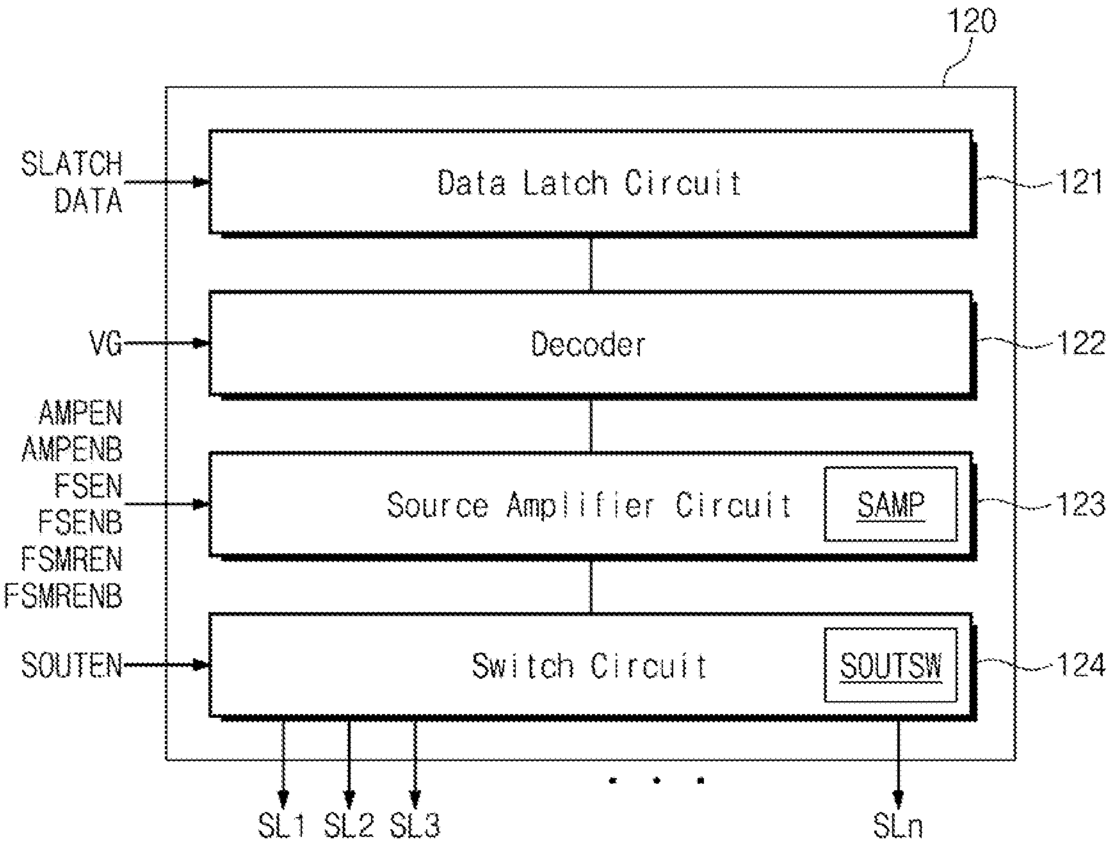
FIG. 2 illustrates a block diagram of a source driver, according to an example embodiment.

FIG. 2 illustrates a block diagram of the source driver 120, according to an example embodiment.

Referring to FIGS. 1 and 2, the source driver 120 may include a data latch circuit 121, a decoder 122, a source amplifier circuit 123, and a switch circuit 124.

The data latch circuit 121 may receive the image data "DATA" and a latch signal SLATCH from the logic block 110. The latch signal SLATCH may refer to a signal indicating that new data to be output by the source driver 120 are input to the data latch circuit 121 (or a signal indicating that data stored in the data latch circuit 121 are updated). The data latch circuit 121 may sample and store the image data "DATA" under control of the logic block 110. The data latch circuit 121 may provide the sampled image data to the decoder 122. The data latch circuit 121 may include a sampling circuit for sampling data, and a holding latch for storing the data sampled by the sampling circuit.

The decoder 122 may receive the sampled image data from the data latch circuit 121, and may receive gamma voltages VG.

The display driver integrated circuit 100 may further include a gamma voltage generator (not illustrated) that generates the gamma voltages VG corresponding to various luminance levels. The number of gamma voltages VG may be determined based on the number of colors to be expressed through the display panel 11 or the number of bits of digital data provided from the outside of the display device 10.

The decoder 122 may select one of the gamma voltages VG based on the sampled image data. The decoder 122 may output the selected gamma voltage(s) to the source amplifier circuit 123. The decoder 122 may be implemented as a digital-to-analog converter.

The source amplifier circuit 123 may receive the selected gamma voltage from the decoder 122, and may receive enable signals AMPEN, FSEN, and FSMREN and complementary enable signals AMPENB, FSENB, and FSMRENB from the logic block 110. In response to the enable signals AMPEN, FSEN, and FSMREN and the complementary enable signals AMPENB, FSENB, and FSMRENB, the source amplifier circuit 123 may amplify the gamma voltage selected by the decoder 122 so as to be provided to the switch circuit 124.

The source amplifier circuit 123 may include source amplifiers SAMP each connected with any one of the source lines SL1 to SLn. Each of the source amplifiers SAMP may be implemented as an operational amplifier. Each of the source amplifiers SAMP may amplify the gamma voltage selected by the decoder 122 so as to be provided to the switch circuit 124 as a data voltage (or a gray scale voltage).

The switch circuit 124 may receive data voltages from the source amplifier circuit 123, and may receive an enable signal SOUTEN from the logic block 110. The switch circuit 124 may include output switches SOUTSW each connected with any one of the source amplifiers SAMP. In response to the enable signal SOUTEN, the switch circuit 124 may send the data voltages to the plurality of pixels of the display panel 11 through the source lines SL1 to SLn.

The data latch signal SLATCH, the enable signals AMPEN, FSEN, FSMREN, and SOUTEN, and the complementary enable signals AMPENB, FSENB, and FSMRENB may be included in the control signals CTRLS generated by the logic block 110.

Figure 3:
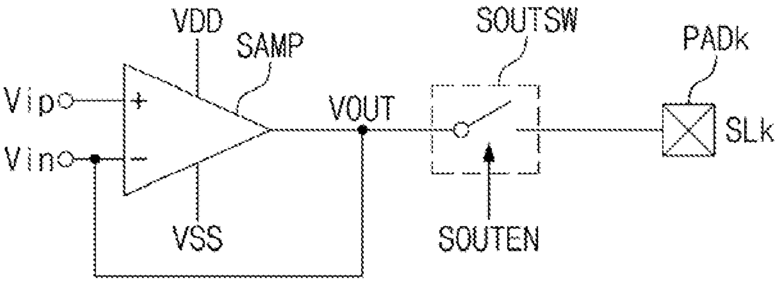
FIG. 3 illustrates a block diagram of a source amplifier, an output switch, and an output pad, according to an example embodiment.

FIG. 3 illustrates a block diagram of a source amplifier SAMP, an output switch SOUTSW, and an output pad PADk, according to an example embodiment.

Referring to FIGS. 1 to 3, an output voltage VOUT output from the source amplifier SAMP may be applied to the output pad PADk (k being any integer between 1 and n) connected with the source line SLk through the output switch SOUTSW.

The source amplifier SAMP may receive voltages VDD and VSS from the power source 150. The source amplifier SAMP may also include a positive input terminal (to which an input voltage Vip is applied), a negative input terminal (to which an input voltage Vin is applied), and an output terminal (from which the output voltage VOUT is output). The negative input terminal of the source amplifier SAMP may be connected with the output terminal of the source amplifier SAMP. For example, the output voltage VOUT may be input to the source amplifier SAMP as the input voltage Vin. The source amplifier SAMP may be implemented as a unity buffer.

The input voltage Vip applied to the source amplifier SAMP may be a gamma voltage selected by the decoder 122. The source amplifier SAMP may amplify or buffer the input voltage Vip, based on the voltages VDD and VSS and the output voltage VOUT. The output voltage VOUT may be a data voltage to be transferred to the source line SLk.

The source amplifier SAMP may output the output voltage VOUT to the output switch SOUTSW. The output switch SOUTSW may connect or disconnect the source amplifier SAMP with or from the output pad PADk in response to the enable signal SOUTEN. For example, the output switch SOUTSW may be turned on or turned off in response to the enable signal SOUTEN. When the output switch SOUTSW is turned on, the output voltage VOUT may be applied to the output pad PADk. The output voltage VOUT may be applied to the source line SLk through the output pad PADk.

Figure 4A:
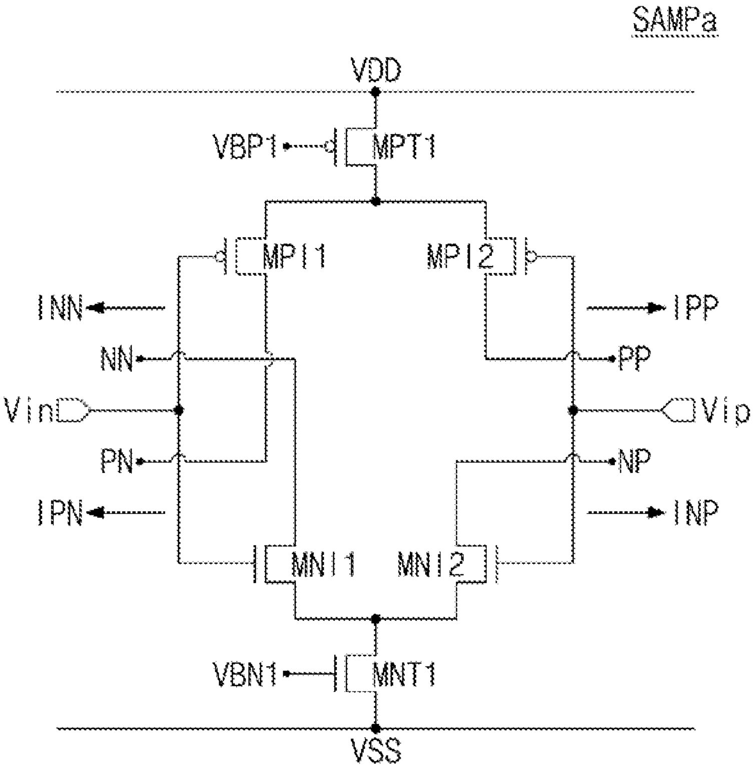
FIGS. 4A and 4B are circuit diagrams illustrating parts of a source amplifier, according to example embodiments.
Figure 4B:
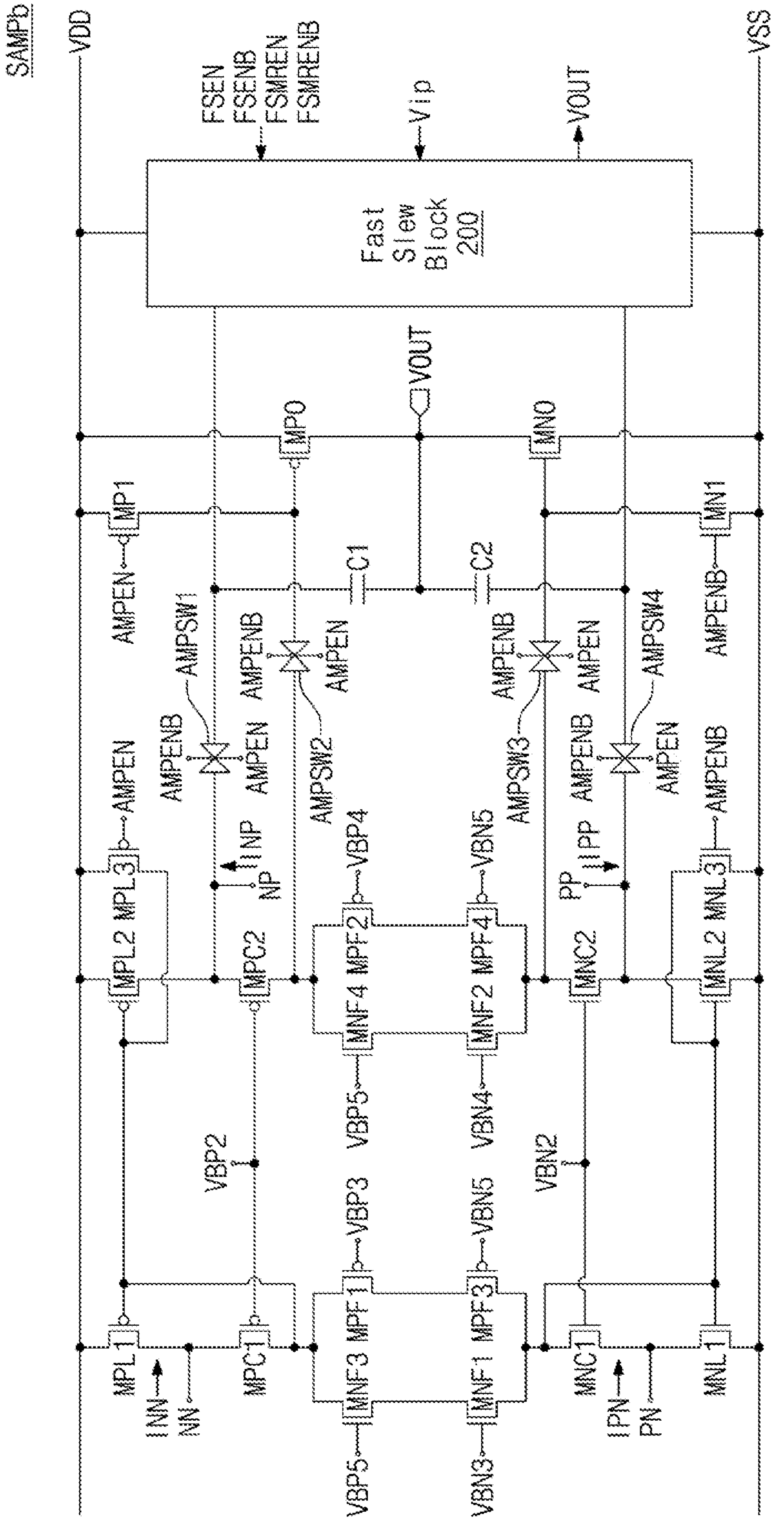

FIGS. 4A and 4B are circuit diagrams illustrating parts of the source amplifier SAMP, according to example embodiments.

In detail, FIG. 4A illustrates a circuit diagram of a source amplifier input part SAMPa, and FIG. 4B illustrates a circuit diagram of a source amplifier output part SAMPb. The source amplifier input part SAMPa may correspond to an input part of the source amplifier SAMP. The source amplifier output part SAMPb may correspond to an output part of the source amplifier SAMP.

An example structure and operation of the source amplifier SAMP will now be described in detail with reference to FIGS. 1 to 4A and 4B.

The display driver integrated circuit 100 may further include a bias voltage generator (not illustrated) that generates bias voltages VBP1 to VBP5 and VBN1 to VBN5. Under control of the logic block 110, the bias voltage generator may generate the bias voltages VBP1 to VBP5 and VBN1 to VBN5 to be applied to the source amplifier SAMP based on a voltage provided from the power source 150. The source amplifier SAMP may output the output voltage VOUT based on the input voltages Vip and Vin and the bias voltages VBP1 to VBP5 and VBN1 to VBN5.

The source amplifier input part SAMPa may include transistors MPT1, MNI1, MNI2, MPI1, MPI2, and MNT1.

The transistors MPT1, MPI1, and MPI2 may be implemented as PMOS transistors, and the transistors MNI1, MNI2, and MNT1 may be implemented as NMOS transistors.

Based on the bias voltages VBP1 and VBN1, the source amplifier input part SAMPa may provide a voltage or current corresponding to a difference between the input voltages Vip and Vin to nodes NN, PN, PP, and NP. For example, the source amplifier input part SAMPa may output currents INN, IPN, IPP, and INP to the nodes NN, PN, PP, and NP, respectively.

The transistor MPT1 may include a first terminal to which the voltage VDD is applied, a gate of receiving the bias voltage VBP1, and a second terminal connected with the transistors MPI1 and MPI2.

The transistor MPI1 may include a first terminal connected with the second terminal of the transistor MPT1, a gate of receiving the input voltage Vin, and a second terminal connected with the node PN.

The transistor MPI2 may include a first terminal connected with the second terminal of the transistor MPT1, a gate of receiving the input voltage Vip, and a second terminal connected with the node PP.

The nodes PN and PP may be connected with the source amplifier output part SAMPb of FIG. 4B.

The transistor MNI1 may include a first terminal connected with the node NN, a gate of receiving the input voltage Vin, and a second terminal connected with the transistor MNT1.

The transistor MNI2 may include a first terminal connected with the node NP, a gate of receiving the input voltage Vip, and a second terminal connected with the transistor MNT1.

The transistor MNT1 may include a first terminal connected with the second terminal of the transistor MNI1 and the second terminal of the transistor MNI2, a gate to which the bias voltage VBN1 is applied, and a second terminal to which the voltage VSS is applied.

The source amplifier output part SAMPb may include transistors MPL1, MPL2, MPL3, MPC1, MPC2, MPF1, MPF2, MPF3, MPF4, MP1, MPO, MNF1, MNF2, MNF3, MNF4, MNC1, MNC2, MNL1, MNL2, MNL3, MN1, and MNO, switches AMPSW1, AMPSW2, AMPSW3, and AMPSW4, capacitors C1 and C2, and a fast slew block 200.

The transistors MPL1, MPL2, MPL3, MPC1, MPC2, MPF1, MPF2, MPF3, MPF4, MP1, and MPO may be implemented as PMOS transistors. The transistors MNF1, MNF2, MNF3, MNF4, MNC1, MNC2, MNL1, MNL2, MNL3, MN1, and MNO may be implemented as NMOS transistors.

The source amplifier output part SAMPb may output the output voltage VOUT in response to the voltages VDD and VSS, the bias voltages VBP2, VBP3, VBP4, VBP5, VBN2, VBN3, VBN4, and VBN5, a signal provided from the source amplifier input part SAMPa through the nodes NN, PN, NP, and PP, and the enable signal AMPEN and the complementary enable signal AMPENB received from the logic block 110.

The transistor MPL1 may include a first terminal to which the voltage VDD is applied, a gate connected with a second terminal of the transistor MPC1, and a second terminal connected with the node NN.

The transistor MPC1 may include a first terminal connected with the node NN and the second terminal of the transistor MPL1, a gate to which the bias voltage VBP2 is applied, and the second terminal connected with the transistors MNF3 and MPF1.

The transistor MNF3 may include a first terminal connected with the second terminal of the transistor MPC1, a gate to which the bias voltage VBP5 is applied, and a second terminal connected with a first terminal of the transistor MNF1.

The transistor MNF1 may include the first terminal connected with the second terminal of the transistor MNF3, a gate to which the bias voltage VBN3 is applied, and a second terminal connected with a first terminal of the transistor MNC1.

The transistor MPF1 may include a first terminal connected with the second terminal of the transistor MPC1, a gate to which the bias voltage VBP3 is applied, and a second terminal connected with a first terminal of the transistor MPF3.

The transistor MPF3 may include the first terminal connected with the second terminal of the transistor MPF1, a gate to which the bias voltage VBN5 is applied, and a second terminal connected with the first terminal of the transistor MNC1.

The transistor MNC1 may include the first terminal connected with the second terminal of the transistor MNF1 and the second terminal of the transistor MPF3, a gate to which the bias voltage VBN2 is applied, and a second terminal connected with a first terminal of the transistor MNL1.

The transistor MNL1 may include the first terminal connected with the node PN and the second terminal of the transistor MNC1, a gate connected with the first terminal of the transistor MNC1, and a second terminal to which the voltage VSS is applied.

The transistor MPL2 may include a first terminal to which the voltage VDD is applied, a gate connected with the gate of the transistor MPL1 and a second terminal of the transistor MPL3, and a second terminal connected with the node NP.

The transistor MPC2 may include a first terminal connected with the node NP and the switch AMPSW1, a gate to which the bias voltage VBP2 is applied, and a second terminal connected with the switch AMPSW2. The gate of the transistor MPC2 may be connected with the gate of the transistor MPC1.

The transistor MPL3 may include a first terminal to which the voltage VDD is applied, a gate of receiving the enable signal AMPEN, and the second terminal connected with the gate of the transistor MPL2.

The transistor MNF4 may include a first terminal connected with the second terminal of the transistor MPC2, a gate to which the bias voltage VBP5 is applied, and a second terminal connected with a first terminal of the transistor MNF2.

The transistor MNF2 may include the first terminal connected with the second terminal of the transistor MNF4, a gate to which the bias voltage VBN4 is applied, and a second terminal connected with a first terminal of the transistor MNC2.

The transistor MPF2 may include a first terminal connected with the second terminal of the transistor MPC2, a gate to which the bias voltage VBP4 is applied, and a second terminal connected with a first terminal of the transistor MPF4.

The transistor MPF4 may include the first terminal connected with the second terminal of the transistor MPF2, a gate to which the bias voltage VBN5 is applied, and a second terminal connected with the first terminal of the transistor MNC2.

The transistor MNC2 may include the first terminal connected with the second terminal of the transistor MNF2, the second terminal of the transistor MPF4, and the switch AMPSW3, a gate to which the bias voltage VBN2 is applied, and a second terminal connected with the switch AMPSW4.

The transistor MNL2 may include a first terminal connected with the second terminal of the transistor MNC2, the node PP, and the switch AMPSW4, a gate connected with a first terminal of the transistor MNL3 and the gate of the transistor MNL1, and a second terminal to which the voltage VSS is applied.

The transistor MNL3 may include the first terminal connected with the gate of the transistor MNL2, a gate to which the complementary enable signal AMPENB is applied, and a second terminal to which the voltage VSS is applied.

The transistor MP1 may include a first terminal to which the voltage VDD is applied, a gate to which the enable signal AMPEN is applied, and a second terminal connected with a gate of the transistor MPO.

The transistor MPO may include a first terminal to which the voltage VDD is applied, a gate connected with the second terminal of the transistor MP1 and the switch AMPSW2, and a second terminal connected with a first terminal of the transistor MNO. The second terminal of the transistor MPO may be connected with a node at which the capacitor C1 and the capacitor C2 are connected. A voltage of the second terminal of the transistor MPO may be the output voltage VOUT.

The transistor MNO may include the first terminal connected with the second terminal of the transistor MPO, a gate connected with the switch AMPSW3, and a second terminal to which the voltage VSS is applied. A voltage of the first terminal of the transistor MNO may be the output voltage VOUT.

The transistor MN1 may include a first terminal connected with the switch AMPSW3 and the gate of the transistor MNO, a gate to which the complementary enable signal AMPENB is applied, and a second terminal to which the voltage VSS is applied.

In other implementations (not shown in FIG. 4B), each of the transistors MPL1, MPL2, MNL1, and MNL2 may be implemented as two or more transistors that are connected in parallel and are substantially identical. For example, the transistor MPL1 may be implemented as two PMOS transistors that are connected in parallel and are substantially identical. When all of the two PMOS transistors included in the transistor MPL1 are turned on, a current may drain through the two PMOS transistors depending on gate voltages applied thereto. When one of the two PMOS transistors is turned on and the other thereof is turned off, a current may drain through the turned-on PMOS transistor depending on a gate voltage applied thereto, and a current may not drain through the turned-off PMOS transistor depending on a gate voltage applied thereto. In other words, the amount of current flowing through the transistor MPL1 may change depending on whether two PMOS transistors included in the transistor MPL1 are turned on or turned off.

The switch AMPSW1 may be connected between a node at which the first terminal of the transistor MPC2 and the node NP are connected and the fast slew block 200.

The switch AMPSW2 may be connected between the second terminal of the transistor MPC2 and the gate of the transistor MPO.

The switch AMPSW3 may be connected between a node at which the transistors MNF2, MPF4, and MNC2 are connected and the gate of the transistor MNO.

The switch AMPSW4 may be connected between a node at which the second terminal of the transistor MNC2 and the node PP are connected and the fast slew block 200.

Each of the switches AMPSW1, AMPSW2, AMPSW3, and AMPSW4 may receive the enable signal AMPEN and the complementary enable signal AMPENB from the logic block 110. Each of the switches AMPSW1, AMPSW2, AMPSW3, and AMPSW4 may be turned on or turned off in response to the enable signal AMPEN and the complementary enable signal AMPENB. The enable signal AMPEN and the complementary enable signal AMPENB may be complementary.

The capacitor C1 may be connected between a node at which the switch AMPSW1 and the fast slew block 200 are connected and the capacitor C2, and the capacitor C2 may be connected between the capacitor C1 and a node at which the switch AMPSW4 and the fast slew block 200 are connected. The node at which the capacitor C1 and the capacitor C2 are connected may be connected with the second terminal of the transistor MPO and the first terminal of the transistor MNO, and may serve as the output terminal of the source amplifier SAMP. Thus, a voltage of the node at which the capacitor C1, the capacitor C2, the second terminal of the transistor MPO, and the first terminal of the transistor MNO are connected may be the output voltage VOUT of the source amplifier SAMP.

The fast slew block 200 may adjust an operating speed of the source amplifier SAMP. For example, the fast slew block 200 may supply an additional current to the source amplifier SAMP such that the capability for the source amplifier SAMP to drive the output voltage VOUT is improved. The fast slew block 200 may receive the enable signals FSEN and FSMREN and the complementary enable signals FSENB and FSMRENB from the logic block 110. The fast slew block 200 may supply an additional current to a node to which the output voltage VOUT is applied, in response to the input voltage Vip, the enable signals FSEN and FSMREN, and the complementary enable signals FSENB and FSMRENB.

Figure 5:
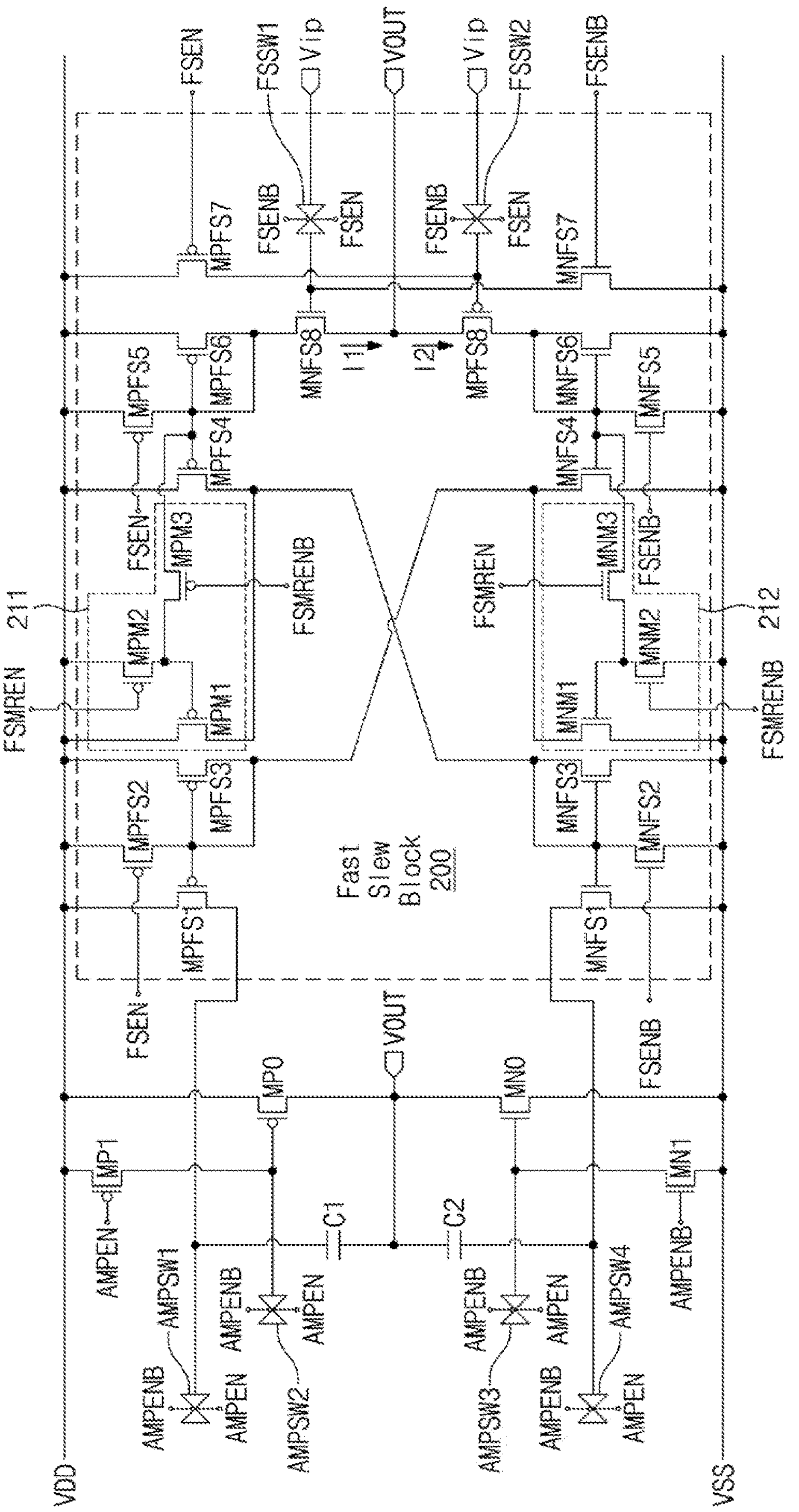
FIG. 5 illustrates a circuit diagram of a fast slew block, according to an example embodiment.

FIG. 5 illustrates a circuit diagram of the fast slew block 200, according to an example embodiment.

As will be understood from FIG. 5, only some components (e.g., the transistors MP1, MPI, MNO, and MN1, the switches AMPSW1, AMPSW2, AMPSW3, and AMPSW4, and the capacitors C1 and C2) of the source amplifier SAMP are illustrated, for convenience of description.

The fast slew block 200 will now be described in detail with reference to FIGS. 1 to 4A, 4B, and 5.

The fast slew block 200 may include transistors MPFS1 to MPSF8 and MNFS1 to MNFS8, switches FSSW1 and FSSW2, and mirror blocks 211 and 212.

The transistors MPFS1 to MPSF8 may be implemented as PMOS transistors, and the transistors MNFS1 to MNFS8 may be implemented as NMOS transistors.

The transistor MPFS1 may include a first terminal to which the voltage VDD is applied, a gate connected with a second terminal of the transistor MPFS2 and a gate of the transistor MPFS3, and a second terminal connected with the switch AMPSW1.

The transistor MPFS2 may include a first terminal to which the voltage VDD is applied, a gate to which the enable signal FSEN is applied, and the second terminal connected with the gate of the transistor MPFS3.

The transistor MPFS3 may include a first terminal to which the voltage VDD is applied, the gate connected with the gate of the transistor MPFS1 and the second terminal of the transistor MPFS2, and a second terminal connected with the gate of the transistor MPFS3.

The transistor MPFS4 may include a first terminal to which the voltage VDD is applied, a gate connected with a second terminal of the transistor MPM3 of the mirror block 211, and a second terminal connected with a second terminal of the transistor MPM1 of the mirror block 211.

The transistor MPFS5 may include a first terminal to which the voltage VDD is applied, a gate to which the enable signal FSEN is applied, and a second terminal connected with the gate of the transistor MPFS4 and a gate of the transistor MPFS6.

The transistor MPFS7 may include a first terminal to which the voltage VDD is applied, a gate to which the enable signal FSEN is applied, and a second terminal connected with a gate of the transistor MPFS8.

The transistor MNFS1 may include a first terminal connected with the switch AMPSW4, a gate connected with a first terminal of the transistor MNFS2 and a gate of the transistor MNFS3, and a second terminal to which the voltage VSS is applied.

The transistor MNFS2 may include the first terminal connected with the gate of the transistor MNFS1 and the gate of the transistor MNFS3, a gate to which the complementary enable signal FSENB is applied, and a second terminal to which the voltage VSS is applied.

The transistor MNFS3 may include a first terminal connected with the gate of the transistor MNFS3, the gate connected with the gate of the transistor MNFS1 and the gate of the transistor MNFS2, and a second terminal to which the voltage VSS is applied.

The transistor MNFS4 may include a first terminal connected with a first terminal of the transistor MNM1 of the mirror block 212, a gate connected with a second terminal of the transistor MNM3 of the mirror block 212, and a second terminal to which the voltage VSS is applied.

The transistor MNFS5 may include a first terminal connected with the gate of the transistor MNFS4 and a gate of the transistor MNFS6, a gate to which the complementary enable signal FSENB is applied, and a second terminal to which the voltage VSS is applied.

The transistor MNFS7 may include a first terminal connected with the gate of the transistor MNFS8, a gate to which the complementary enable signal FSENB is applied, and a second terminal to which the voltage VSS is applied.

The transistor MNFS8 may include a first terminal connected with the second terminal of the transistor MPFS6, the gate connected with the first terminal of the transistor MNFS7 and the switch FSSW1, and a second terminal connected with a first terminal of the transistor MPFS8.

The transistor MPFS8 may include the first terminal connected with the second terminal of the transistor MNFS8, the gate connected with the second terminal of the transistor MPFS7 and the switch FSSW2, and a second terminal connected with the first terminal of the transistor MNFS6. A voltage of a node at which the second terminal of the transistor MNFS8 and the first terminal of the transistor MPFS8 are connected may be the output voltage VOUT. A current I1 may be output from the second terminal of the transistor MNFS8 to the output terminal of the source amplifier SAMP. A current I2 may be applied to the first terminal of the transistor MPFS8.

When the transistor MNFS8 is turned on, the source amplifier SAMP may supply a current to a corresponding source line. On the other hand, when the transistor MPFS8 is turned on, the source amplifier SAMP may decrease the amount of current to be supplied to the corresponding source line.

The switch FSSW1 may be connected between the gate of the transistor MNFS8 and a node to which the input voltage Vip is applied, and the switch FSSW2 may be connected between the gate of the transistor MPFS8 and a node to which the input voltage Vip is applied. Each of the switches FSSW1 and FSSW2 may receive the enable signal FSEN and the complementary enable signal FSENB from the logic block 110, and may be turned on (or enabled) or turned off (or disabled) in response to the enable signal FSEN and the complementary enable signal FSENB. The enable signal FSEN and the complementary enable signal FSENB may be complementary.

The fast slew block 200 may be enabled in response to the enable signal FSEN of logic high. As such, the fast slew block 200 may supply an additional current, which is based on the voltages VDD and VSS, to the node from which the output voltage VOUT is output. The fast slew block 200 may be disabled in response to the enable signal FSEN of logic low.

The mirror blocks 211 and 212 may adjust a level of an additional current (e.g., a sum current of the current I1 and the current I2) that is supplied from the fast slew block 200 to the node from which the output voltage VOUT is output. The mirror blocks 211 and 212 may be enabled or disabled in response to the enable signal FSMREN and the complementary enable signal FSMRENB.

Below, it is assumed that when the mirror blocks 211 and 212 are enabled, the fast slew block 200 is already enabled. For example, when the enable signal FSMREN transitions to logic high, the enable signal FSEN may transition to logic high at the same time with the enable signal FSMREN or before the enable signal FSMREN. When the enable signal FSMREN transitions to logic low, the enable signal FSEN may transition to logic low at the same time with the enable signal FSMREN or after the enable signal FSMREN.

While the mirror blocks 211 and 212 are enabled, the mirror blocks 211 and 212 may further increase the amount of current of the additional current that is supplied to the node from which the output voltage VOUT is output, thus improving the driving capability of the source amplifier SAMP. For example, while the mirror blocks 211 and 212 are enabled, the mirror blocks 211 and 212 may additionally provide a path through which a current flows, and thus, the amount of additional current that is supplied to the node from which the output voltage VOUT is output may be increased. As such, a slew rate of the output voltage VOUT of the source amplifier SAMP may be improved, and data voltages may be supplied to the plurality of pixels of the display panel 11 faster.

A length of a time during which the mirror blocks 211 and 212 are enabled may be variable depending on positions of pixels. For example, as a pixel is more distant from the source driver 120, a length of a time during which the mirror blocks 211 and 212 associated with the pixel are enabled may be increased. This will be described in additional detail with reference to FIG. 6.

The mirror block 211 may include transistors MPM1, MPM2, and MPM3.

The transistor MPM1 may include a first terminal to which the voltage VDD is applied, a gate connected with a second terminal of the transistor MPM2 and a first terminal of the transistor MPM3, and the second terminal connected with the second terminal of the transistor MPFS4.

The transistor MPM2 may include a first terminal to which the voltage VDD is applied, a gate to which the enable signal FSMREN is applied, and the second terminal connected with the first terminal of the transistor MPM3 and the gate of the transistor MPM1.

The transistor MPM3 may include the first terminal connected with the gate of the transistor MPM1 and the second terminal of the transistor MPM2, a gate to which the complementary enable signal FSMRENB is applied, and the second terminal connected with the gate of the transistor MPFS4.

The mirror block 212 may include transistors MNM1, MNM2, and MNM3.

The transistor MNM1 may include the first terminal connected with the first terminal of the transistor MNFS4, a gate connected with a first terminal of the transistor MNM2 and a first terminal of the transistor MNM3, and a second terminal to which the voltage VSS is applied.

The transistor MNM2 may include the first terminal connected with the gate of the transistor MNM1 and the first terminal of the transistor MNM3, a gate to which the complementary enable signal FSMRENB is applied, and a second terminal to which the voltage VSS is applied.

The transistor MNM3 may include the first terminal connected with the gate of the transistor MNM1 and the first terminal of the transistor MNM2, a gate to which the enable signal FSMREN is applied, and the gate connected with the gate of the transistor MNFS4.

In response to the enable signal FSMREN of logic high, the mirror block 211 may supply an additional current to the node of the output voltage VOUT, and the mirror block 212 may sink an additional current from the node of the output voltage VOUT. The mirror block 211 may be a current source block, and the mirror block 212 may be a current sink block.

Referring to the mirror block 211, when the input voltage Vip is sufficiently great (e.g., a gamma voltage is applied to the source amplifier SAMP), in response to the enable signal FSMREN of logic high and the complementary enable signal FSMRENB of logic low, the transistor MPM3 may be turned on, and the transistor MPM2 may be turned off. As such, an additional current based on the voltage VDD may be supplied to the second terminal of the transistor MPFS4 through the transistor MPM1. Due to the additional current, a gate voltage of the transistor MPFS4 and a gate voltage of the transistor MNFS6 may increase, and thus, a magnitude of a current supplied to the second terminal of the transistor MNFS6 may increase. Thus, the mirror block 211 may provide a path for supplying an additional current to the node of the output voltage VOUT by using the transistor MPM1. As a result, the driving capability of the source amplifier SAMP may be improved. For example, the source amplifier SAMP may charge pixels with data voltages at a faster speed.

Similar to the above description, the mirror block 212 may provide a path for supplying an additional current from the node of the output voltage VOUT to a terminal to which the voltage VSS is applied, by using the transistor MNM1. For example, when the input voltage Vip is sufficiently small (e.g., a gamma voltage is not applied to the source amplifier SAMP), in response to the enable signal FSMREN of logic high and the complementary enable signal FSMRENB of logic low, the transistor MNM3 may be turned on, and the transistor MNM2 may be turned off. As such, an additional current based on the voltage VSS may be supplied from the first terminal of the transistor MNFS4 to the terminal to which the voltage VSS is applied, through the transistor MNM1. Due to the additional current, a gate voltage of the transistor MNFS4 and a gate voltage of the transistor MNFS6 may increase, and thus, a magnitude of a current supplied from the first terminal to the second terminal of (or flowing through) the transistor MNFS6 may increase. In other words, the mirror block 212 may provide a path for supplying an additional current from the node of the output voltage VOUT to the terminal to which the voltage VSS is applied, by using the transistor MNM1. As a result, the voltage adjusting capability of the source amplifier SAMP may be improved. For example, when data voltage to be supplied to source lines are smaller than voltages of the source lines, the source amplifier SAMP may decrease the voltages of the source lines to the data voltages more rapidly.

Figure 6:
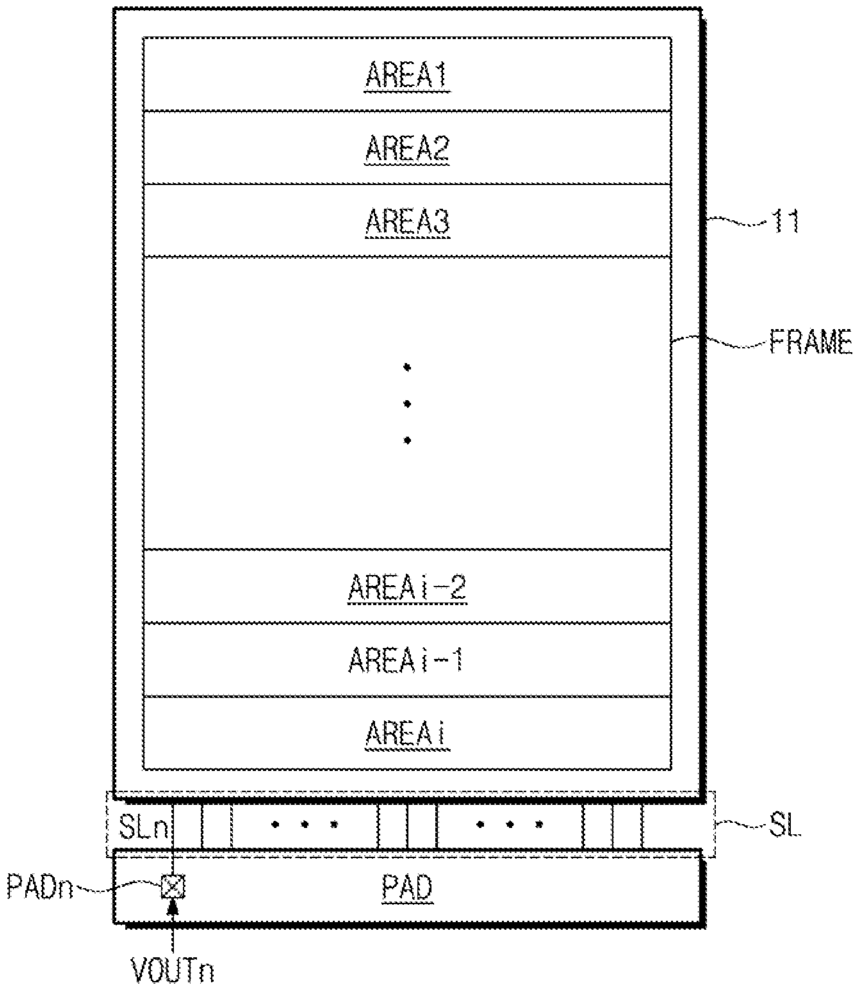
FIG. 6 illustrates one frame displayed on a display panel and a pad area connected therewith, according to an example embodiment.

FIG. 6 illustrates one frame "FRAME" displayed on the display panel 11, and a pad area PAD connected therewith, according to an example embodiment.

Referring to FIGS. 1, 2, 5, and 6, the frame "FRAME" displayed on the display panel 11 may be divided into one or more areas AREA1 to AREAi (i being a natural number).

The display panel 11 may be connected with the pad area PAD of the source driver 120 through source lines SL. The pad area PAD may include a plurality of pads (e.g., a pad PADn) respectively corresponding to the source lines SL1 to SLn. Each of the plurality of pads may receive the corresponding output voltage VOUT (or data voltage) from the corresponding source amplifier SAMP through the corresponding output switch SOUTSW so as to be transferred to the corresponding source line.

For example, the pad PADn of the pad area PAD may correspond to the source line SLn. The pad PADn may receive an output voltage VOUTn from the corresponding source amplifier SAMP. The output voltage VOUTn may be supplied to pixels connected with the source line SLn through the pad PADn and the source line SLn.

Each of the areas AREA1 to AREAi may correspond to one or more gate lines. For example, the area AREAi may include pixels connected with the gate line GL1. For another example, the area AREAi may include the pixels connected with the gate line GL1 and pixels connected with the gate line GL2.

As a pixel, that is, a gate line, is disposed more distant from the pad area PAD of the source driver 120, a length of a source line from the pad area PAD to the corresponding pixel may increase. In this case, a resistance and a capacitance of the source line from the pad area PAD to the pixel may increase, thereby increasing a time necessary for a data voltage to be charged to the pixel. For example, referring to FIG. 1, lengths of source lines from the pad area PAD to pixels connected with the gate line GLm may be longer than lengths of source lines from the pad area PAD to pixels connected with the gate line GL1. As such, a time that is taken to charge pixels connected with the gate line GLm with data voltages may be longer than a time that is taken to charge pixels connected with the gate line GL1 with data voltages.

While the enable signal FSMREN is maintained at logic high, the mirror blocks 211 and 212 of the fast slew block 200 may be enabled. As such, the driving capability of the source driver 120 may be improved, and thus, a time that is taken to charge pixels of the display panel 11 with data voltages may be shortened. As a result, an operating speed of the display device 10 may be improved.

In the present example embodiment, a length of a time during which the enable signal FSMREN is maintained at logic high may be differently set for each of the areas AREA1 to AREAi.

The length of the time during which the enable signal FSMREN is maintained at logic high may be based on a distance between a corresponding pixel to a source line associated with the enable signal FSMREN and the pad area PAD. For example, as a distance from the pad area PAD of the source driver 120 increases, a time during which the enable signal FSMREN is maintained at logic high may increase. As such, as an area is increasingly distant from the pad area PAD of the source driver 120, a voltage adjusting capability (e.g., a driving capability and a recovery capability) of the source driver 120 may be increased with respect to that area, and thus, a time taken to charge pixels included in that area with data voltages may be shortened. As a result, a time that is taken to display image data on the display panel 11 (e.g., a settling time) may be shortened.

On the other hand, with regard to areas (e.g., the areas AREAi-2, AREAi-1, and AREAi) close to the pad area PAD of the source driver 120, a driving capability of the source driver 120 may be enhanced to a lesser degree or not at all. For example, output voltages of the source driver 120 may be prevented from being undershot or overshot when pixels included in areas close to the pad area PAD of the source driver 120 are charged with data voltages. Accordingly, a settling time may be prevented from becoming long due to unnecessary enhancement of the driving capability of the source driver 120.

A length of a time during which the enable signal FSMREN corresponds to logic high when data voltages are supplied to pixels of the area AREA1 (or a duty of the enable signal FSMREN corresponding to the area AREA1) may be longer than a length of a time during which the enable signal FSMREN corresponds to logic high when data voltages are supplied to pixels of the area AREAi (or a duty of the enable signal FSMREN corresponding to the area AREAi). As such, a time that is taken to charge pixels of the area AREA1 with data voltages may be reduced by the mirror blocks 211 and 212. Also, output voltages from the source driver 120 may be prevented from being undershot or overshot when the data voltages are supplied to the pixels of the area AREAi.

Transitioning from the area AREA1 to the area AREAi, a length of a time during which the enable signal FSMREN is maintained at (or corresponds to) logic high may be gradually decreased. As such, even though a slew rate of the source driver 120 changes with regard to the areas AREA1 to AREAi, a landscape type of noise may be prevented from occurring at boundaries of the areas AREA1 to AREAi. For example, a length of a time during which the enable signal FSMREN corresponds to logic high when data voltages are supplied to pixels of the area AREA1 of the areas AREA1 to AREAi may be maximum, whereas a length of a time during which the enable signal FSMREN corresponds to logic high when data voltages are supplied to pixels of the area AREAi of the areas AREA1 to AREAi may be minimum.

In an implementation (not shown), the logic block 110 of the display driver integrated circuit 100 may include a display clock generator. Under control of the logic block 110, the display clock generator may generate a display clock to be used in the display device 10, based on a dot clock DCLK. The logic block 110 may generate the enable signal FSMREN based on the display clock.

As will be described below in additional detail with reference to FIG. 7, a duty of the enable signal FSMREN may be determined to correspond to a multiple of one cycle (or a period) of the display clock. For example, a length of a time during which the enable signal FSMREN corresponds to logic high may be a multiple of a length of a time during which one display clock corresponds to logic high. For another example, the enable signal FSMREN may maintain logic high during a plurality of cycles of the display clock and may then transition to logic low.

Duties of the enable signal FSMREN, which respectively correspond to the areas AREA1 to AREAi, may be adjusted in units of one cycle of the display clock. For example, the duties of the enable signal FSMREN, which respectively correspond to the areas AREA1 to AREAi, may sequentially decrease. For example, when the duty of the enable signal FSMREN corresponding to the area AREA1 is j times the cycle of the display clock (j being a natural number), the duty of the enable signal FSMREN corresponding to the area AREA2 may be (j−1) times the cycle of the display clock. In other words, the enable signal FSMREN corresponding to the area AREA1 may maintain logic high during "j" cycles of the display clock, and the enable signal FSMREN corresponding to the area AREA2 may maintain logic high during (j-1) cycles of the display clock. As such, a difference between a slew rate of the source driver 120 associated with the area AREA1 and a slew rate of the source driver 120 associated with the area AREA2 may not be visually perceived by the user of the display device 10.

As described above, a magnitude of a current that is output from the source driver 120 may be adjusted based on a settling time of pixels located distant from the pad area PAD (e.g., pixels of the area AREA1). The source driver 120 including the mirror blocks 211 and 212 may improve a slew rate for pixels located the most distant from the pad area PAD. As such, when the display device 10 operates at high speed, a settling time may be shortened. In addition, when the display device 10 operates at low speed, the source driver 120 may charge pixels with a less amount of current, thus providing a low-power operation.

Figure 7:
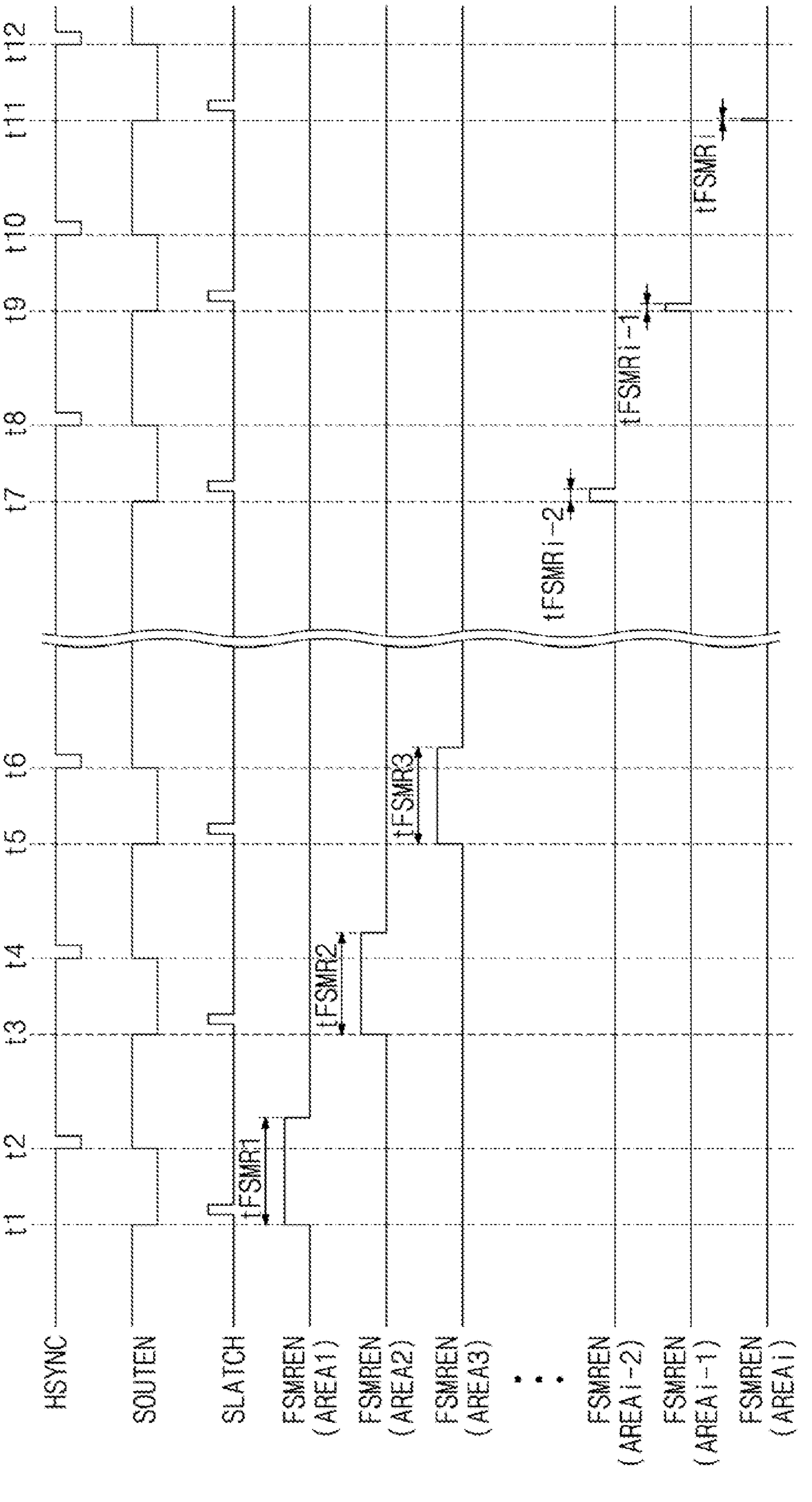
FIG. 7 illustrates a timing diagram for describing an operation of a display device, according to an example embodiment.

FIG. 7 illustrates a timing diagram for describing an operation of the display device 10, according to an example embodiment.

How a length of a time during which the enable signal FSMREN corresponds to (or is maintained at) logic high is determined with regard to the areas AREA1 to AREAi will be described with reference to FIGS. 1, 2, 5, 6, and 7. For convenience of description, it is assumed that the areas AREA1, AREA2, AREA3, AREAi-2, AREAi-1, and AREAi correspond to the gate lines GLm, GLm-1, GLm-2, GL3, GL2, and GL1, respectively.

Referring to FIG. 7, at time t1, the enable signal SOUTEN may transition to logic low. As such, the output switch SOUTSW may be turned off After time t1, the latch signal SLATCH that is input to the latch circuit 121 of the source driver 120 may toggle, and thus, the latch circuit 121 may be updated with new image data.

During a time interval tFSMR1 from time t1, the enable signal FSMREN may correspond to (or maintain) logic high. As such, the mirror blocks 211 and 212 may be enabled.

At time t2, the enable signal SOUTEN may transition to logic high. In this case, the output switch SOUTSW may be turned on, and thus, data voltages may start to be supplied to pixels (e.g., pixels connected with the gate line GLm) included in the area AREA1 from the source amplifier SAMP. For example, the source amplifier SAMP may supply data voltages, which are based on the image data updated in response to the latch signal SLATCH, to the pixels of the area AREA1. The source amplifier SAMP may supply the pixels of the area AREA1 with a current whose amount is greater than that when the mirror blocks 211 and 212 are disabled.

At time t3, the enable signal SOUTEN may transition to logic low. As such, the output switch SOUTSW may be turned off. After time t3, the latch signal SLATCH that is input to the latch circuit 121 of the source driver 120 may toggle, and thus, the latch circuit 121 may be updated with new image data.

During a time interval tFSMR2 from time t3, the enable signal FSMREN may correspond to (or maintain) logic high. As such, the mirror blocks 211 and 212 may be enabled.

At time t4, the enable signal SOUTEN may transition to logic low. In this case, the output switch SOUTSW may be turned on, and thus, data voltages may start to be supplied to pixels (e.g., pixels connected with the gate line GLm-1) included in the area AREA2 from the source amplifier SAMP. For example, the source amplifier SAMP may supply data voltages, which are based on the image data updated in response to the latch signal SLATCH, to the pixels of the area AREA2. The source amplifier SAMP may supply the pixels of the area AREA2 with a current whose amount is greater than that when the mirror blocks 211 and 212 are disabled.

In the above-described example, the time interval tFSMR1 may be longer than the time interval tFSMR2. For example, a difference between the time interval tFSMR1 and the time interval tFSMR2 may be a multiple of a time during which one display clock is maintained at logic high.

At time t5, the enable signal SOUTEN may transition to logic low. As such, the output switch SOUTSW may be turned off. After time t5, the latch signal SLATCH that is input to the latch circuit 121 of the source driver 120 may toggle, and thus, the latch circuit 121 may be updated with new image data.

During a time interval tFSMR3 from time t5, the enable signal FSMREN may correspond to (or maintain) logic high. As such, the mirror blocks 211 and 212 may be enabled.

At time t6, the enable signal SOUTEN may transition to logic high. In this case, the output switch SOUTSW may be turned on, and thus, data voltages may start to be supplied to pixels included in the area AREA3 from the source amplifier SAMP. For example, the source amplifier SAMP may supply data voltages, which are based on the image data updated in response to the latch signal SLATCH, to the pixels of the area AREA3. The source amplifier SAMP may supply the pixels of the area AREA3 (e.g., pixels connected with the gate line GLm-2) with a current whose amount is greater than that when the mirror blocks 211 and 212 are disabled.

In the above-described example, like a relationship between the time interval tFSMR1 and the time interval tFSMR2, the time interval tFSMR2 may be longer than the time interval tFSMR3.

Similarly, the source driver 120 may sequentially supply data voltages of pixels of the areas AREA4 to AREAi-3 from time t6 to time t7, and, with the transition from the area AREA4 to the area AREAi-3, a time during which the enable signal FSMREN is maintained at logic high may gradually decrease.

At time t7, the enable signal SOUTEN may transition to logic low. As such, the output switch SOUTSW may be turned off. After time t7, the latch signal SLATCH that is input to the latch circuit 121 of the source driver 120 may toggle, and thus, the latch circuit 121 may be updated with new image data.

During a time interval tFSMRi-2 from time t7, the enable signal FSMREN may correspond to (or maintain) logic high. As such, the mirror blocks 211 and 212 may be enabled during the time interval tFSMRi-2. The mirror blocks 211 and 212 may be disabled in response to that the enable signal FSMREN transitions to logic low.

At time t8, the enable signal SOUTEN may transition to logic high. In this case, the output switch SOUTSW may be turned on, and thus, data voltages may start to be supplied to pixels (e.g., pixels connected with the gate line GL2) included in the area AREAi-2 from the source amplifier SAMP. For example, the source amplifier SAMP may supply data voltages, which are based on the image data updated in response to the latch signal SLATCH, to the pixels of the area AREAi-2. The source amplifier SAMP may supply the pixels of the area AREAi-2 with a current whose amount is greater than that when the mirror blocks 211 and 212 are disabled. As the mirror blocks 211 and 212 are disabled after a time interval tFSMRi-2 passes from time t7, a magnitude of a current that is output from the source amplifier SAMP may decrease, and thus, the overshoot or undershoot of data voltages may be prevented.

At time t9, the enable signal SOUTEN may transition to logic low. As such, the output switch SOUTSW may be turned off. After time t9, the latch signal SLATCH that is input to the latch circuit 121 of the source driver 120 may toggle, and thus, the latch circuit 121 may be updated with new image data.

During a time interval tFSMRi-1 from time t9, the enable signal FSMREN may correspond to (or maintain) logic high. As such, the mirror blocks 211 and 212 may be enabled during the time interval tFSMRi-1. The mirror blocks 211 and 212 may be disabled in response to that the enable signal FSMREN transitions to logic low.

At time t10, the enable signal SOUTEN may transition to logic high. In this case, the output switch SOUTSW may be turned on, and thus, data voltages may start to be supplied to pixels (e.g., pixels connected with the gate line GL2) included in the area AREAi-1 from the source amplifier SAMP. For example, the source amplifier SAMP may supply data voltages, which are based on the image data updated in response to the latch signal SLATCH, to the pixels of the area AREAi-1. The source amplifier SAMP may supply the pixels of the area AREAi-1 with a current whose amount is greater than that when the mirror blocks 211 and 212 are disabled. As the mirror blocks 211 and 212 are disabled after a time interval tFSMRi-1 passes from time t9, a magnitude of a current that is output from the source amplifier SAMP may decrease, and thus, the overshoot or undershoot of data voltages may be prevented.

In the above-described example, like a relationship between the time interval tFSMR1 and the time interval tFSMR2, the time interval tFSMRi-2 may be longer than the time interval tFSMRi-1.

At time t11, the enable signal SOUTEN may transition to logic low. As such, the output switch SOUTSW may be turned off. After time t11, the latch signal SLATCH that is input to the latch circuit 121 of the source driver 120 may toggle, and thus, the latch circuit 121 may be updated with new image data.

During a time interval tFSMRi from time t11, the enable signal FSMREN may correspond to (or maintain) logic high. As such, the mirror blocks 211 and 212 may be enabled during the time interval tFSMRi. The mirror blocks 211 and 212 may be disabled in response to that the enable signal FSMREN transitions to logic low.

At time t12, the enable signal SOUTEN may transition to logic high. In this case, the output switch SOUTSW may be turned on, and thus, data voltages may start to be supplied to pixels (e.g., pixels connected with the gate line GL1) included in the area AREAi from the source amplifier SAMP. For example, the source amplifier SAMP may supply data voltages, which are based on the image data updated in response to the latch signal SLATCH, to the pixels of the area AREAi. The source amplifier SAMP may supply the pixels of the area AREAi with a current whose amount is greater than that when the mirror blocks 211 and 212 are disabled. As the mirror blocks 211 and 212 are disabled after a time interval tFSMRi passes from time t11, a magnitude of a current that is output from the source amplifier SAMP may decrease, and thus, the overshoot or undershoot of data voltages may be prevented.

In the above-described example, like a relationship between the time interval tFSMR1 and the time interval tFSMR2, the time interval tFSMRi-1 may be longer than the time interval tFSMRi.

In one frame, in transitioning from the area AREA1 to the area AREAi, a time during which the mirror blocks 211 and 212 are enabled may be gradually decreased. As such, a slew rate of the source amplifier SAMP (or the driving capability for the source amplifier SAMP to drive an output) may be optimized. Thus, a slew rate of the source amplifier SAMP, which is associated with pixels of areas located distant from the pad area PAD (i.e., pixels connected with source lines of a great load (e.g., a great capacitance and/or a great resistance)), may be improved. In addition, the output voltage VOUT of the source amplifier SAMP, which is associated with pixels of areas (e.g., the areas AREAi-2, AREAi-1, and AREAi) located close to the pad area PAD (i.e., pixels connected with source lines of a small load (e.g., a small capacitance and/or a small resistance)), may be prevented from being overshot or undershot unnecessarily.

A time during which the enable signal FSMREN is maintained at logic high may linearly decrease across the areas AREA1 to AREAi. For example, a difference between the time interval tFSMR1 and the time interval tFSMR2 and a difference between the time interval tFSMR2 and the time interval tFSMR3 may be identical.

In an implementation (not shown in FIG. 7), when pixels of the area AREAi are selected, the mirror blocks 211 and 212 may not be enabled.

In another implementation, when a first area and a second area are adjacent to each other, a difference between a time during which the enable signal FSMREN associated with the first area is maintained at logic high and a time during which the enable signal FSMREN associated with the second area is maintained at logic high may be uniform.

Figure 8:
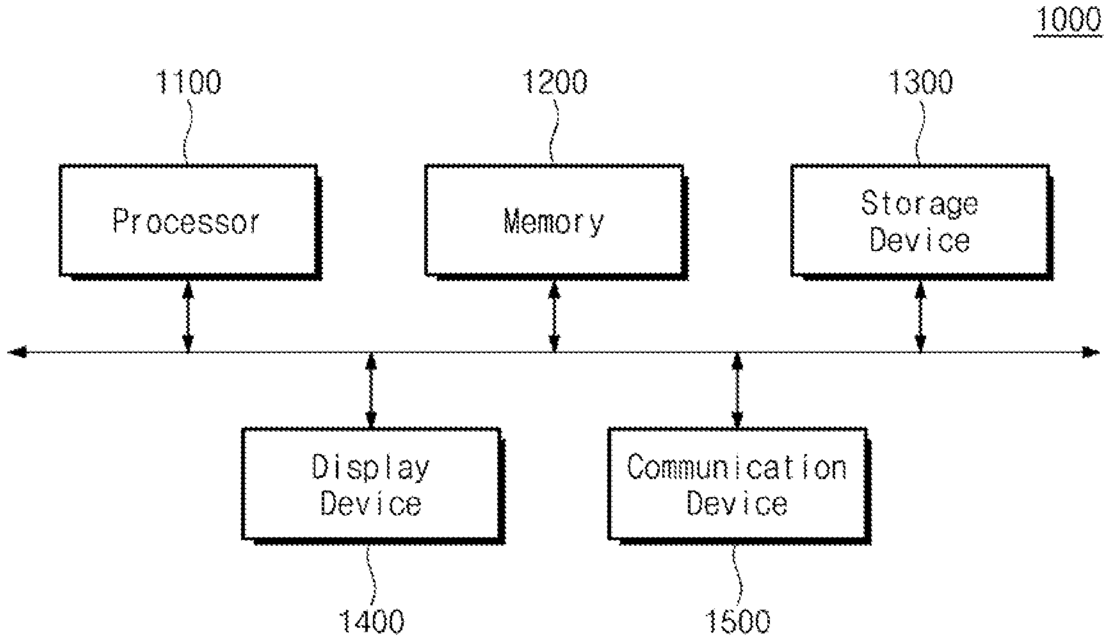
FIG. 8 illustrates a block diagram of an electronic device, according to an example embodiment.

FIG. 8 illustrates a block diagram of an electronic device 1000, according to an example embodiment.

Referring to FIG. 8, the electronic device 1000 may include a processor 1100, a memory 1200, a storage device 1300, a display device 1400, and a communication device 1500. The processor 1100, the memory 1200, the storage device 1300, the display device 1400, and the communication device 1500 may exchange data with each other through an internal bus.

The processor 1100 may control overall operations of the electronic device 1000. The processor 1100 may execute a variety of software, firmware, or program codes loaded onto the memory 1200. The processor 1100 may function as a central processing unit of the electronic device 1000. The processor 1100 may include one or more processor cores.

The memory 1200 may store data and program codes that are processed by the processor 1100 or are scheduled to be processed by the processor 1100. For example, the software, firmware, program codes, or instructions to be executed by the processor 1100 may be loaded onto the memory 1200. The memory 1200 may function as a main memory device of the electronic device 1000. The memory 1200 may include a dynamic random access memory (DRAM), a static random access memory (SRAM), a phase-change random access memory (PRAM), a magnetic random access memory (MRAM), a ferroelectric random access memory (FeRAM), a resistive random access memory (RRAM), etc. The memory 1200 may be also referred to as a "buffer memory" or a "cache memory". Unlike the illustrated example, the electronic device 1000 may include two or more memories 1200. Unlike the illustrated example, the memory 1200 may be implemented as an external device capable of communicating with the electronic device 1000.

The storage device 1300 may store data generated by the processor 1100 for the purpose of long storage, a file to be driven by the processor 1100, or various software, firmware, program codes, or instructions executable by the processor 1100. The storage device 1300 may function as an auxiliary memory device of the electronic device 1000. The storage device 1300 may include a NAND flash memory, a NOR flash memory, etc. Unlike the illustrated example, the electronic device 1000 may include two or more storage devices 1300. Unlike the illustrated example, the storage device 1300 may be implemented as an external device capable of communicating with the electronic device 1000.

The display device 1400 may provide the user with an image under control of the processor 1100. For example, the display device 1400 may include the display device 10, which includes the fast slew block 200 in which the mirror blocks 211 and 212 of FIG. 5 are implemented.

The communication device 1500 may communicate with an external device of the electronic device 1000 in various wired or wireless protocols. For example, under control of the processor 1100, the communication device 1500 may receive data from the external device or may send data stored in the memory 1200 or the storage device 1300 to the external device. The communication device 1500 may include a user interface that receives data from the user of the electronic device 1000 or outputs data to the user.

As described above, a source amplifier may include a fast slew block for supplying a larger current to source lines. The fast slew block may include mirror blocks that increase a magnitude of a current to be output from the fast slew block. One frame may be divided into a plurality of areas that are arranged perpendicular to the source amplifier, and a time during which the mirror blocks are enabled may be differently set for each area. As such, a slew rate of the source amplifier may be optimized depending on a length of a source line from the source amplifier to each pixel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A source amplifier configured to output a data voltage to a display panel based on a first driving voltage, a second driving voltage, a first input voltage, and a second input voltage, the source amplifier comprising:

a first circuit configured to generate a first current, a second current, a third current, and a fourth current based on the first driving voltage, the second driving voltage, the first input voltage applied to a gate of a fourth p-type transistor, directly connected to a set of p-type transistors, and the second input voltage applied to a gate of a fourth n-type transistor, directly connected to a set of n-type transistors, and to output the data voltage to an output terminal of the source amplifier based on the first to fourth currents; and a second circuit connected with the first circuit, and configured to supply a fifth current to the output terminal of the source amplifier based on the first driving voltage, the second driving voltage, and the second input voltage, the second circuit including:

a first mirror circuit connected with a first terminal to which the first driving voltage is applied, and configured to supply a sixth current to the output terminal; and a second mirror circuit connected with a second terminal to which the second driving voltage is applied, and configured to supply a seventh current from the output terminal to the second terminal;

wherein the first mirror circuit includes:

a first p-type transistor connected between the first terminal and the second circuit;

a second p-type transistor directly connected between the first terminal and a gate of the first p-type transistor; and a third p-type transistor connected between the gate of the first p-type transistor and the second circuit;

wherein the second mirror circuit includes:

a first n-type transistor directly connected between the second circuit and the second terminal;

a second n-type transistor connected between a gate of the first n-type transistor and the second terminal; and a third n-type transistor connected between the gate of the first n-type transistor and the second circuit, and wherein:

the second p-type transistor includes a gate to which a first enable signal is applied, the third p-type transistor includes a gate to which a second enable signal is applied, and the first enable signal and the second enable signal are complementary.

2. The source amplifier as claimed in claim 1, wherein the second circuit includes:

a fourth transistor connected between the first terminal and the first p-type transistor;

a fifth transistor connected between a gate of the fourth transistor and the output terminal; and a sixth transistor connected between the first terminal and the gate of the fourth transistor, and wherein the gate of the fourth transistor is connected with the third p-type transistor.

3. The source amplifier as claimed in claim 1, wherein:

the second n-type transistor includes a gate to which a first enable signal is applied, the third n-type transistor includes a gate to which a second enable signal is applied, and the first enable signal and the second enable signal are complementary.

4. The source amplifier as claimed in claim 1, wherein the second circuit includes:

a fourth transistor connected between the first n-type transistor and the second terminal;

a fifth transistor connected between the output terminal and a gate of the fourth transistor; and a sixth transistor connected between the gate of the fourth transistor and the second terminal, and wherein the gate of the fourth transistor is connected with the third n-type transistor.

5. A display device, comprising:

a display panel including a plurality of pixels; and a display driver integrated circuit, the display driver integrated circuit including:

a gate driver connected with the plurality of pixels through a first to an m-th gate line, and configured to enable the first to m-th gate lines;

a source driver connected with the plurality of pixels through a first to an n-th source line and including a plurality of source amplifiers respectively connected with the first to n-th source lines; and a timing controller configured to generate signals for controlling the gate driver and the source driver, wherein:

a first source amplifier of the plurality of source amplifiers includes:

a first circuit configured to output a first current to an output terminal of the first source amplifier by amplifying an input voltage applied to a gate of a fourth p-type transistor, directly connected to a set of p-type transistors, and a gate of a fourth n-type transistor, directly connected to a set of n-type transistors, and a second circuit connected with the first circuit, and configured to output a second current to the output terminal based on the input voltage, the second circuit includes a third circuit configured to adjust a level of the second current in response to an enable signal, wherein the third circuit includes:

a first p-type transistor connected between a first terminal to which a first driving voltage is applied and the second circuit;

a second p-type transistor directly connected between the first terminal and a gate of the first p-type transistor;

a third p-type transistor connected between the gate of the first p-type transistor and the second circuit;

a fourth n-type transistor connected between the second circuit and a second terminal to which a second driving voltage is applied;

a fifth n-type transistor directly connected between a gate of the fourth n-type transistor and the second terminal; and a sixth n-type transistor connected between the gate of the fourth n-type transistor and the second circuit, and wherein the second p-type transistor includes a gate to which a first enable signal from the timing controller is applied, the third p-type transistor includes a gate to which a second enable signal from a logic block is applied, and the first enable signal and the second enable signal are complementary.

6. The display device as claimed in claim 5, wherein:

the display panel is partitioned into a plurality of areas along a first direction, the plurality of areas including a first area corresponding to a first gate line and a second area corresponding to a second gate line, the first enable signal has a first duty when the first gate line is enabled by the gate driver, the first enable signal has a second duty when the second gate line is enabled by the gate driver, a distance between the source driver and the first gate line is greater than a distance between the source driver and the second gate line, and the first duty is greater than the second duty.

7. The display device as claimed in claim 5, wherein:

the display panel is partitioned into a plurality of areas along a first direction, the plurality of areas including a first area corresponding to a first gate line and a second gate line and a second area corresponding to a third gate line and a fourth gate line, the first enable signal has a first duty when one of the first gate line and the second gate line is enabled by the gate driver, the first enable signal has a second duty when one of the third gate line and the fourth gate line is enabled by the gate driver, a distance between the source driver and the first gate line is longer than a distance between the source driver and the third gate line, and the first duty is greater than the second duty.

8. A display device, comprising:

a display panel including a plurality of pixels; and a display driver integrated circuit, the display driver integrated circuit including:

a gate driver connected with the plurality of pixels through a first to an m-th gate line, and configured to enable the first to m-th gate lines; and a source driver connected with the plurality of pixels through a first to an n-th source line and including a plurality of source amplifiers respectively connected with the first to n-th source lines, wherein:

a first source amplifier of the plurality of source amplifiers includes:

a first circuit configured to generate a first to a fourth current based on a first driving voltage, a second driving voltage, a first input voltage applied to a gate of a fourth p-type transistor, directly connected to a set of p-type transistors, and a second input voltage applied to a gate of a fourth n-type transistor, directly connected to a set of n-type transistors, and to output a first data voltage to an output terminal of the first source amplifier based on the first to fourth currents; and a second circuit connected with the first circuit, and configured to supply a fifth current to the output terminal of the first source amplifier based on the first driving voltage, the second driving voltage, and the second input voltage, and the second circuit includes:

a first mirror circuit configured to supply a sixth current to the output terminal based on the first driving voltage; and a second mirror circuit configured to supply a seventh current from the output terminal to a first terminal to which the second driving voltage is applied;

wherein the first mirror circuit includes:

a first p-type transistor connected between the first terminal and the second circuit;

a second p-type transistor connected between the first terminal and a gate of the first p-type transistor; and a third p-type transistor connected between the gate of the first p-type transistor and the second circuit; and wherein the second circuit includes:

a fourth n-type transistor connected between the first terminal and the first p-type transistor;

a fifth n-type transistor connected between a gate of the fourth n-type transistor and the output terminal; and a sixth n-type transistor connected between the first terminal and the gate of the fourth n-type transistor, and wherein the gate of the fourth n-type transistor is connected with the third p-type transistor.

9. The display device as claimed in claim 8, wherein:

the second p-type transistor includes a gate to which a first enable signal is applied, the third p-type transistor includes a gate to which a second enable signal is applied, and the first enable signal and the second enable signal are complementary.

* * * * *